US011254836B2

(12) United States Patent
Phang et al.

(10) Patent No.: US 11,254,836 B2
(45) Date of Patent: Feb. 22, 2022

(54) ONE-STEP HEADLIGHT RESTORATION KIT AND FORMULATION

(71) Applicant: Illinois Tool Works Inc., Glenview, IL (US)

(72) Inventors: Tze Lee Phang, Houston, TX (US); Jiafu Fang, Houston, TX (US)

(73) Assignee: Illinois Tool Works Inc., Glenview, IL (US)

( * ) Notice: Subject to any disclaimer, the term of this patent is extended or adjusted under 35 U.S.C. 154(b) by 523 days.

(21) Appl. No.: 15/809,507

(22) Filed: Nov. 10, 2017

(65) Prior Publication Data

US 2018/0134915 A1  May 17, 2018

Related U.S. Application Data

(60) Provisional application No. 62/421,099, filed on Nov. 11, 2016.

(51) Int. Cl.
| | | |
|---|---|---|
| *C09D 175/04* | (2006.01) | |
| *B60S 3/04* | (2006.01) | |
| *B05D 1/28* | (2006.01) | |
| *B24B 13/00* | (2006.01) | |
| *C08G 18/44* | (2006.01) | |

(Continued)

(52) U.S. Cl.
CPC ............. *C09D 175/04* (2013.01); *B05D 1/28* (2013.01); *B24B 13/00* (2013.01); *B60S 3/047* (2013.01); *C08G 18/44* (2013.01); *B05D 2201/00* (2013.01); *B05D 2503/00* (2013.01); *F21S 41/28* (2018.01); *F21S 45/10* (2018.01)

(58) Field of Classification Search
CPC . B60S 3/047; B60S 3/00; B60S 3/045; C09D 175/04
See application file for complete search history.

(56) References Cited

U.S. PATENT DOCUMENTS

| 3,479,310 A | 11/1969 | Dieterich et al. |
|---|---|---|
| 4,307,219 A | 12/1981 | Larson |

(Continued)

FOREIGN PATENT DOCUMENTS

EP       1957552 A1    8/2008

OTHER PUBLICATIONS

"Rain-X Original Glass Water Repellent" to ITW Global Brands 2015. (Year: 2015).*

(Continued)

*Primary Examiner* — Peter Y Choi
(74) *Attorney, Agent, or Firm* — Blue Filament Law PLLC

(57) ABSTRACT

A one-step headlight restoration formulation is also provided that includes a polyurethane dispersion of aliphatic polycarbonate urethane present from 20 to 85 total weight percent, along with a wetting agent present from 1 to 4 total weight percent. A biocide is present from 0.005 to 0.5 total weight percent of the formulation. A carrier constitutes the remainder of the formulation. A kit for a one-step headlight restoration is provided that includes a wipe for applying said formulation to a headlight surface in need of resurfacing as a one step process. The process of using the kit includes removing a formulation impregnated wipe from an envelope and contacting the wipe with the headlight surface to apply said formulation by wiping evenly on a headlight lens surface to form a restorative film.

12 Claims, 2 Drawing Sheets

(51) Int. Cl.
*F21S 41/20* (2018.01)
*F21S 45/10* (2018.01)

(56) References Cited

U.S. PATENT DOCUMENTS

| | | | |
|---|---|---|---|
| 4,507,430 A | 3/1985 | Shimada et al. | |
| 5,672,653 A | 9/1997 | Frisch et al. | |
| 6,433,073 B1 | 8/2002 | Kantner et al. | |
| 7,163,446 B1* | 1/2007 | Cole | B24B 13/00 451/41 |
| 8,801,860 B1* | 8/2014 | Wall | C11D 7/264 134/4 |
| 2005/0058515 A1 | 3/2005 | Markusch et al. | |
| 2006/0263527 A1* | 11/2006 | Ripley | C08G 18/0847 427/301 |
| 2011/0045219 A1 | 2/2011 | Stewart et al. | |
| 2012/0259063 A1* | 10/2012 | Gertzmann | C08G 18/6662 524/591 |
| 2017/0198150 A1* | 7/2017 | Endle | C09D 5/021 |

OTHER PUBLICATIONS

"Rain-X Original Glass Water Repellent" to ITW Global Brands 2020. (Year: 2020).*
Enlarged picture of Rain-X wipes. (Year: 2020).*
"Rain-X One-Step Headlight Restoration Wipe" Safety Data Sheet. (Year: 2018).*
"Unithane PC-385 NFX," Union Specialties Inc., available at http://www.unionspecialtiesinc.com/uns-live/wp-content/uploads/formidable/14/UNITHANE-PC-385-NFX.pdf, revision date Sep. 2016. (Year: 2016).*

* cited by examiner

ONE-STEP HEADLIGHT RESTORATION KIT AND FORMULATION

RELATED APPLICATIONS

This application claims priority benefit of U.S. Provisional Application Ser. No. 62/421,099 filed Nov. 11, 2016; the contents of which are hereby incorporated by reference.

FIELD OF THE INVENTION

The present invention in general relates to restorative formulations and in particular to a one step headlight restoration formula.

BACKGROUND OF THE INVENTION

Over time, ultraviolet radiation, weather, and other environmental factors can wear away the exterior surface of vehicle headlights. The effects can vary from just a slight haze to making headlight lenses virtually opaque. These aged headlight lenses not only make the vehicle look old, but also pose a serious threat to safety due to the compromised night vision by the reduced brightness of the headlights.

Currently, there are products in the marketplace for restoration of worn headlight lenses. These products usually require several steps and some even requiring power tools. Existing lens restoration kits basically involve sanding away the outer, hazy surface of the headlight lenses, and then using progressively finer abrasives and polishing the lens to a smooth finish. FIG. 1 illustrates an existing, prior art restoration kit 10 made up of a headlight restorer 12, a polishing lubricant 14, a sealant 16, a towel 18, and a set of coarse to fine sanding pads 20. The process requires three separate applications of chemicals as well as three separate intermediate sanding operations. The process is both cumbersome and time consuming, and requires the user to follow the directions with a level of skill and in the correct order to obtain desired results.

Dispersible polyurethane polymers are well known to the art and illustratively formed as disclosed in U.S. Pat. Nos. 3,479,310; 4,307,219; 4,507,430; 5,672,653; and 6,433,073. However, these generally provide a tacky coating or have surface tensions that preclude forming a continuous coating on clear polycarbonate or acrylic such as poly(methyl methacrylate), (pMMA).

Thus, there exists a need for a headlight restoration formulation that provides a simplified process for restoration of vehicle headlights, which minimizes the number of application steps.

SUMMARY OF THE INVENTION

A kit for a one-step headlight restoration is provided that includes a wipe. A formulation is either impregnated into the wipe or present in a container. The formulation includes a polyurethane dispersion of aliphatic polycarbonate urethane dispersed in a carrier for dispersing the polyurethane dispersion. Instructions for applying said formulation to a headlight surface in need of resurfacing are also provided as a one step process. A process of using the kit includes removing a formulation impregnated wipe from an envelope and contacting the wipe with the headlight surface to apply said formulation by wiping evenly on a headlight lens surface. After allowing sufficient time for the formulation to dry, a restorative film is present on the headlight surface.

A one-step headlight restoration formulation is also provided that includes a polyurethane dispersion of aliphatic polycarbonate urethane present from 20 to 85 total weight percent, along with a wetting agent present from 1 to 4 total weight percent. A biocide is present from 0.005 to 0.5 total weight percent of the formulation. A carrier of a glycol/alcohol and water present in a ratio of 60:40-95:5 (w/w) constitutes the remainder of the formulation.

BRIEF DESCRIPTION OF THE DRAWINGS

The present invention is further detailed with respect to the following drawings. These figures are not intended to limit the scope of the present invention but rather illustrate certain attributes thereof.

DETAILED DESCRIPTION OF THE INVENTION

Figure 1:
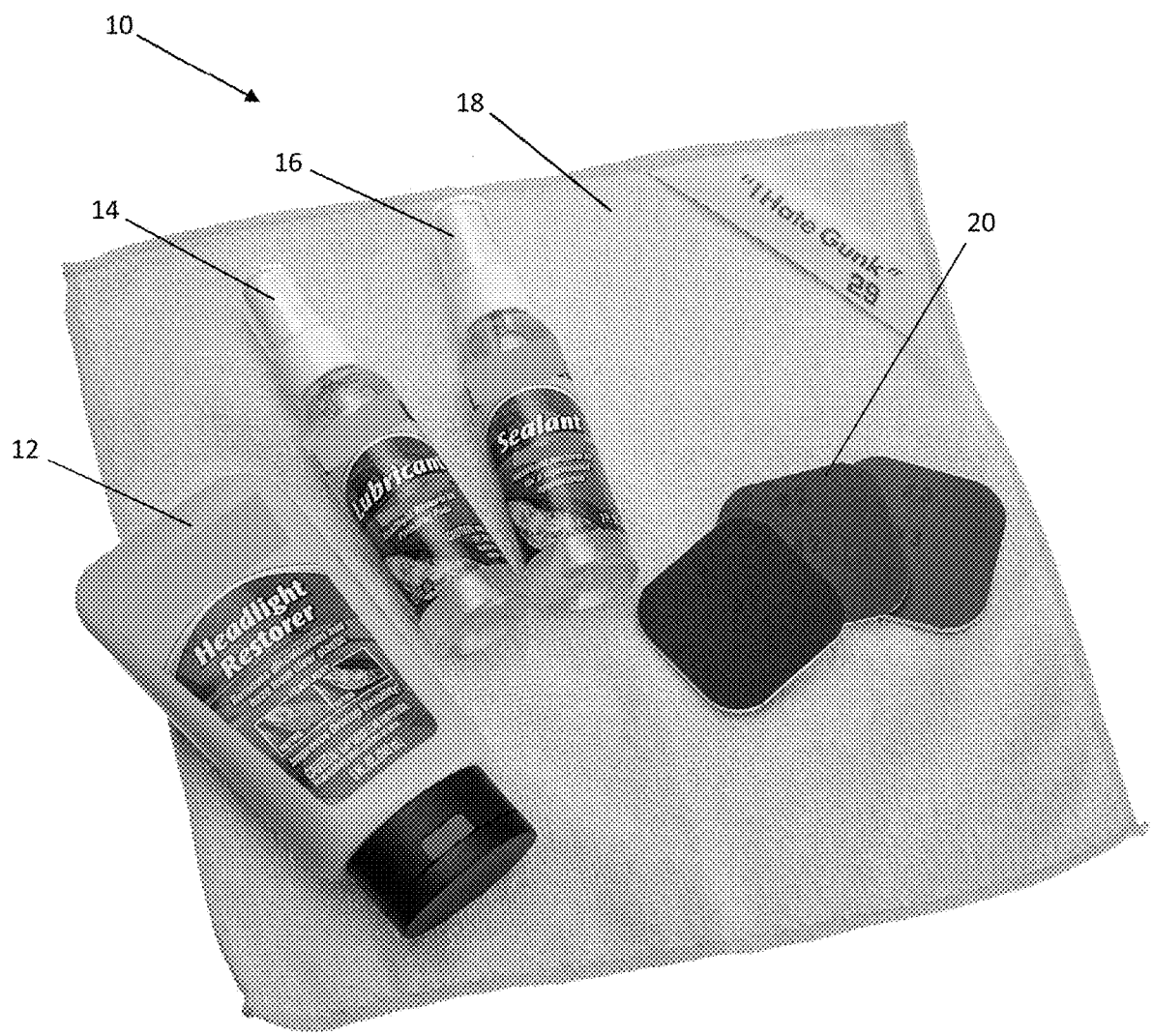
FIG. 1 is an image a of a prior art headlight restoration kit.
Figure 2:
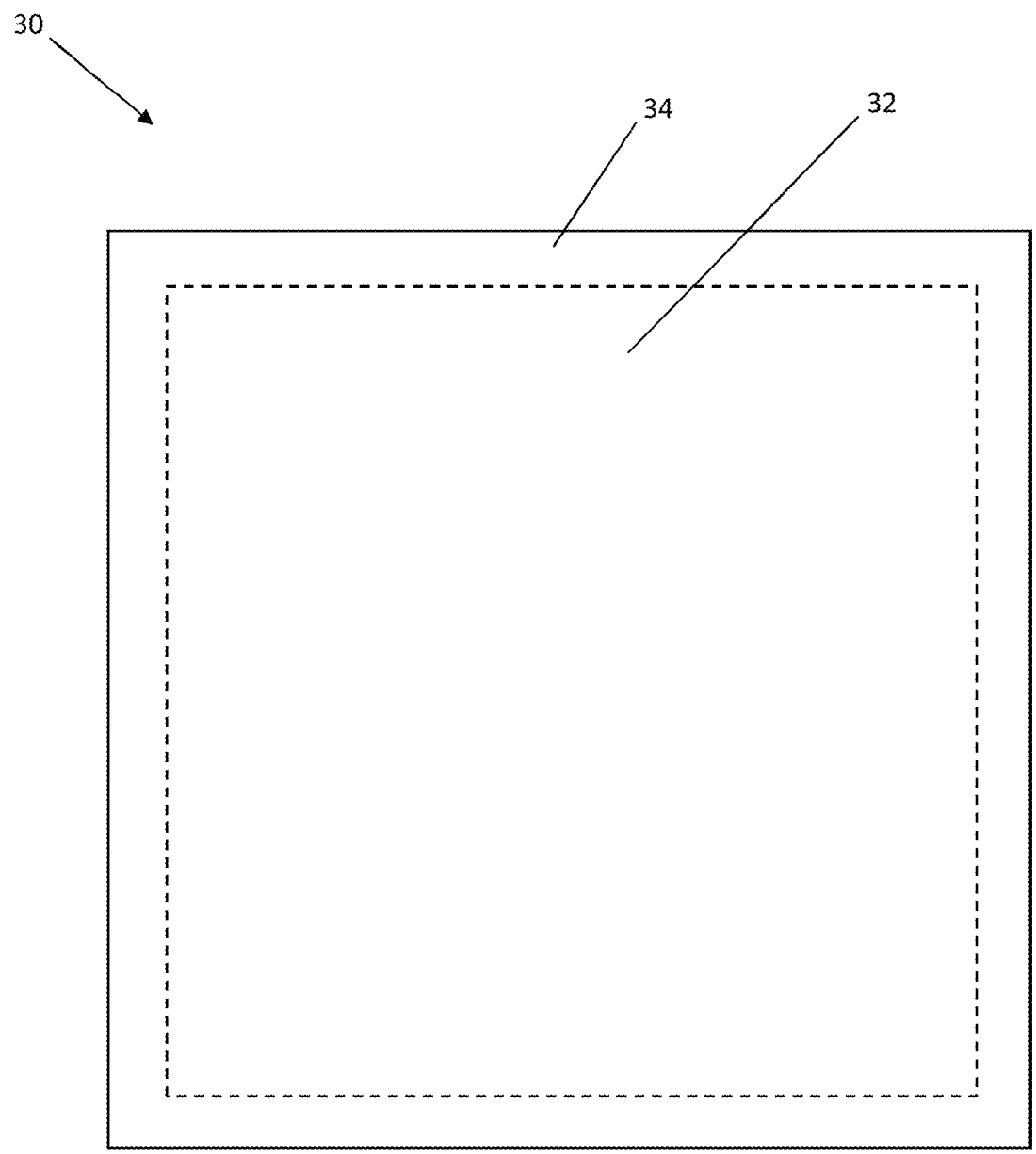
FIG. 2 illustrates a one-step headlight restoration formulation pre-applied to a wipe and packaged in a sealed envelope according to the present invention.

The present invention has utility as a one-step headlight restoration formulation. Embodiments of the inventive one-step headlight restoration formulation may be pre-applied to a wipe or provided in a spray dispenser for use with a wipe. FIG. 2 shows a pre-moistened wipe 32 in a sealed envelope 34 for inclusion in a one-step headlight restoration kit 30.

Embodiments of the inventive one-step headlight restoration wipe formulation include a polyurethane dispersion of aliphatic polycarbonate urethane, with additives illustratively including one or any combination of the following materials: biocide, cleaning solvent, defoamer, light stabilizer, corrosion inhibitor, and flow/wetting/leveling agents. In addition, a carrier capable of dissolving the above components is also part of the formulation.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

As used herein, "dispersion" with respect to dispersible polyurethane is defined as a two-phase system where one phase contains discrete particles of polyurethane distributed throughout a bulk solvent phase, the particles being the disperse or internal phase, and the bulk substance the continuous or external phase. It is appreciated that a minor amount, typically less than 5 weight percent of the polyurethane is soluble in the bulk phase solvent.

According to the present invention, the continuous phase is an alcohol-water mixture and at least a portion of the polyurethane exists as discrete particles.

It is desirable that the dispersion remains stable under ambient conditions of 20 degrees Celsius in a dark container at standard pressure. Inventive dispersions are stable at room temperature for more than 30 days impregnated in a wipe. In other embodiments, for more than 90 days, more than 180 days, and even more than 360 days.

An inventive kit includes a disposable wipe formed of woven or non-woven fibers. A dispersion formulation is provided impregnated into the wipe, or in a separate container along with instructions for contacting the formulation with a weathered clear polycarbonate or pMMA target surface. It is appreciated that the container can be opened and applied to the wipe as a liquid or include a propellant for aerosol application onto the wipe or directly onto the clear polycarbonate or pMMA surface.

The dispersion formulation is a polyurethane dispersion of aliphatic polycarbonate urethane. The polyurethane dispersion being a reaction product of a polyol component that is soluble or dispersible in the carrier and a polyisocyanate component having blocked isocyanate groups that is soluble or dispersible in water. The polyol component containing at least 5 polyol molecule percent polycarbonate.

As used herein, a "polyol" is defined as a compound having an average functionality greater than 1, preferably greater than 1.8, and most typically 2.0 or above to about 2.7. It is understood to include compounds that have (i) alcohol groups on primary, secondary, and tertiary carbon atoms, primary and secondary amines, mercaptans, and mixtures thereof. Accordingly, the inventive polyurethane dispersions can contain urea linkages from the reaction of isocyanate functional polyurethanes with amines, these polymers more appropriately being labeled as "polyurethane-ureas." Polyols useful for preparing the prepolymer have a polymer weight average molecular weight of 58 to 8,000.

The polycarbonate polyol is formed by reaction of diols illustratively including 1,3-propanediol, ethylene glycol, propylene glycol, 1,4-propanediol, diethylene glycol, triethylene glycol, tetraethylene glycol, 1,4-butanediol, 1,6-hexanediol, trimethylenepentanediol, 1,4-cyclohexanediol, 1,4-cyclohexanedimethanol, 2-methyl-1,8-octanediol, 1,10-decamethyleneglycol, 1,2-tetradecanediol, neopentyl glycol, 1,8-octanediol, 1,9-noanediol, and combinations thereof; or lactones such as c-caprolactone. A polycarbonate polyol can be represented by the structure:

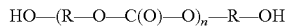

HO—(R—O—C(O)—O)$_n$—R—OH wherein R is a group given by removing hydroxyl groups from the corresponding diol (HO—R—OH), and n is a positive integer, in the range of from 2 to 50 inclusive. It is appreciated that polycarbonate polyols may be made with a branched structure by the use of tri- and multifunctional hydroxyl compounds such as glycerol, trimethylolpropane, trimethylolethane, hexanetriol isomers, pentaerythritol and mixtures of these compounds replacing a portion of the diols to create an average OH value of greater than 2.0.

Cycloaliphatic isocyanates operative herein illustratively include hexamethylene diisocyanate, butane diisocyanate, isophorone diisocyanate, 1-methyl-2,4(2,6)-diisocyanato cyclohexane, norbornane diisocyanate, tetramethylxylylene diisocyanate, hexahydroxylylene diisocyanate, 4,4'-diisocyanatodicyclohexylmethane, monomeric triisocyanates such as 4-isocyanatomethyl-1,8-octamethylene diisocyanate, 1,3-bis(isocyanatomethyl)cyclohexane, 1,3-bis(1-isocyanato-1-methylethyl)benzene, diphenylmethane 4,4'-diisocyanate, 4,4',4"-triisocyanatotriphenylmethane, polymethylene polyphenylene polyisocyanate, toluene diisocyanate, hexamethylene diisocyanate, dodecamethylene diisocyanate, m- and p-xylene diisocyanate, and mixtures thereof.

Other polyisocyanate compounds operative herein illustratively include 2,4-tolylene diisocyanate, 2,6-tolylene diisocyanate, isophorone diisocyanate, 1,6-hexamethylene diisocyanate, 1,3-trimethylene diisocyanate, 1,4-tetramethylene diisocyanate, 2,2,4-trimethylhexamethylene diisocyanate, 2,4,4-trimethylhexamethylene diisocyanate, 1,9-nonamethylene diisocyanate, 1,10-decamethylene diisocyanate, 1,4-cyclohexane diisocyanate, 2,2'-diethylether diisocyanate, diphenylmethane-9,4'-diisocyanate, (o-, m- or p-)xylene diisocyanate, methylenebis(4-cyclohexylisocyanate), cyclohexane-1,3-dimethylene diisocyanate, cyclohexane-1,4-dimethylene diisocyanate, 1,5-naphthalene diisocyanate, p-phenylene diisocyanate, 3,3'-methylene ditolylene-4,4'-diisocyanate, 4,4'-diphenylether diisocyanate, tetrachlorophenylene diisocyanate, norbornane diisocyanate, hydrogenated (1,3- or 1,4-)xylylene diisocyanate, and combinations thereof.

In some inventive embodiments, the alicyclic polyisocyanate compound is 10 molecule number percent or more to the total amount, 100 molecule number percent, of the polyisocyanate present. In still other embodiments, between 20 and 80 molecule number percent.

The amounts of the polyol and isocyanate used to form the dispersal, and the proportions of polycarbonate functional are modified to adjust the physical and chemical properties of the refinished clear polycarbonate or pMMA surface coating. Properties that can be varied illustratively include tensile strength, modulus, abrasion resistance, minimum film-forming temperature, glass transition temperature, ultraviolet light resistance, and resistance to hydrolysis and color stability. In general, longer chain polyols tend to provide films made from the dispersions that are more ductile and have lower Tg, higher elongation, and lower tensile strength; with shorter chain polyols tending towards coating films that have high modulus, greater tensile strength, and higher Tg. Aliphatic polyols tend to provide materials with decreased water uptake that is critical in the inventive kit and object of single step clear polycarbonate or pMMA refinishing.

The synthesis of dispersible polyurethanes of aliphatic polycarbonate urethane is illustratively detailed in EP1957552, US20050058515, and US20110045219.

The carrier operative as the dispersion continuous phase include $C_1$-$C_6$ aliphatic alcohols which are linear or branched, glycol ethers, water, and mixtures thereof. In some inventive embodiments, the alcohols are ethanol, n-propanol, or 2-propanol (IPA). In other inventive embodiments, the carrier is a mixture of water, or alcohol/glycol. Typically, the organic to water ratio is 60:40 to 95:5 w/w. The carrier may also comprise additional solvents. Glycol ethers operative herein illustratively include both hydrophilic and hydrophobic glycol ethers of: ethylene glycol, propylene glycol, dipropylene glycol n-propyl ether, propylene glycol methyl ether, propylene glycol n-propyl ether, dipropylene glycol n-butyl ether, tripropylene glycol n-butyl ether, propylene glycol phenyl ether, propylene glycol methyl ether acetate, dipropylene glycol methyl ether, oligomers thereof, or combinations thereof. For example, other rapid evaporating solvents may be used, such as hexamethyldisiloxane (HMDS), $C_4$-$C_{10}$ alkanes, acetone, and combinations thereof.

An inventive formulation when not present pre-impregnated into a wipe optionally includes a halocarbon or hydrocarbon propellant in instances when an aerosol delivery of the formulation is desired. Aerosol propellants operative herein illustratively include difluoroethane, trifluoroethane; alkanes such as butane, pentane, isobutane; propane; ethers such as dimethyl ether and diethyl ether; nitrogen; carbon dioxide; and combinations thereof. The resultant formulation inclusive of a propellant is sealed within a conventional metal aerosol canister and applied by spray application as is conventional to the art, either onto the wipe or directly onto the headlight clear polycarbonate or pMMA surface in need of restoration.

In certain embodiments of the invention, various additives enhance a property of an inventive formulation; the property illustratively including storage stability, film formation, film durability and clear polycarbonate or pMMA cleaning properties. Additives are provided such as a light stabilizer, a defoamer, a wetting agent or combinations thereof.

In certain embodiments of the invention, a wetting agent is present in an amount to reduce the surface tension of the formulation to the extent that the composition is able to wet a clear polycarbonate or pMMA target surface. A wetting agent is chosen that is compatible with the dispersion. Wetting agents operative herein illustratively include various classes of wetting surfactants for reducing interfacial tension at the substrate-water and/or oil/water interfaces for easy removal of soils or solvents such as glycol ethers, alcohols and ketones, Anionic, such as linear alkylbenzene sulfonates, alcohol sulfates, alcohol ether sulfates, alcohol ethoxylated sulfates, alpha olefin sulfonates, a-sulfomethyl ester; and nonionic, such as alcohol ethoxylates, alkyl phenol ethoxylates. Alkanolamides, alkylglucosides; surfactants are used as wetting agents. It should be appreciated that each of the above wetting agents is commercially available in at least one form. A wetting agent, if present, in an inventive composition is present from 0.05 to 5 total weight percent and in some instances from 1 to 4 total weight percent.

A light stabilizer illustratively includes TINUVIN 292® (BASF Resins), and is typically being present from 0 to 3 total weight percent and preferably between 0.05 and 1 total weight percent.

A defoaming agent is present in certain embodiment in an amount present to inhibit surfactant foaminess, if desired, and allow for smooth formation of a hydrophobic film produced from an inventive composition. Defoamer agents operative herein illustratively include silicone-based defoamers; mineral oil-based defoamers, and mixtures of foam destroying polymers and hydrophobic solids such as polyurias, as are known to the art. Specific exemplary silicone-based defoamers illustratively include silica-filled polydimethyl siloxane and polyether-modified polysiloxanes. A defoaming agent, if present, in an inventive composition is present from 0.05 to 5 total weight percent.

A biocide operative herein illustratively includes quaterniums, triclosan, PCMX, and other conventional antibacterials. The biocide is typically being present from 0 to 2 total weight percent and preferably between 0.005 and 0.5 total weight percent.

An inventive composition is readily stored in glass, metal, or plastic containers made of plastics such as polyethylenes, polypropylenes, nylons, PVC, or PET, or aerosol cans or impregnated into the wipe substrate as a solution and sealed in a storage stable envelope.

Typical and preferred compositions according to the present inventions are provided in Table 1.

TABLE 1

| Inventive Composition (amounts in total weight percent exclusive of optional propellant) | Typical | Preferred |
|---|---|---|
| Polyurethane dispersion of aliphatic polycarbonate urethane | 20-85 | 50-70 |
| Light stabilizer | 0-3 | 0.05-1 |
| Wetting agent | 0-5 | 1-4 |

TABLE 1-continued

| Inventive Composition (amounts in total weight percent exclusive of optional propellant) | Typical | Preferred |
|---|---|---|
| Defoaming agent | 0-5 | 0.05-5 |
| Biocide | 0-2 | 0.005-0.5 |
| Carrier | Remainder | Remainder |
| Organics/water ratio (w/w) | 60:40-95:5 | 70:30-90:10 |

An inventive composition is readily provided as a kit in the form of a bottle, wipe or aerosol canister. The bottle optionally equipped with a pump- or spray-trigger. With the provision of an optional wipe remove excess composition, along with instructions for doing so, an inventive kit is operational. The instructions providing details as how to prepare a headlight substrate, apply the inventive composition, removal of excess from the substrate and the time and properties of the film so applied. The instructions can also provide details as to how the composition is re-applied after an applied film is worn. In the case when the kit includes a pre-impregnated wipe, the instructions may include how to open an envelope containing the wipe and rubbing the wipe on the headlight surface. Instructions may also include the donning of protective equipment such as gloves to limit skin contact and eye protection.

EXAMPLES

The present invention is further detailed with respect to the following examples. These examples are intended to illustrate non-limiting specific embodiments of the present invention.

Example 1

A first formulation for a one-step headlight restorative is provided in Table 2.

TABLE 2

| Ingredients | Weight |
|---|---|
| De-ionized water | 9.90 |
| Wetting agent | 2.00 |
| Hydrophilic glycol ether | 28.00 |
| Biocide | 0.10 |
| Polyurethane dispersion | 60.00 |
| Total | 100.00 |

Example 2

A second formulation for a one-step headlight restorative is provided in Table 3.

TABLE 3

| Ingredients | Weight |
|---|---|
| De-ionized water | 9.40 |
| Hydrophobic glycol ether | 9.40 |
| Polyurethane dispersion | 80.00 |

TABLE 3-continued

| Ingredients | Weight |
| --- | --- |
| Wetting agent | 0.20 |
| Defoamer | 0.90 |
| Biocide | 0.10 |
| Total | 100.00 |

Example 3

Formulations 1 and 2 were applied on various used headlights. The application included applying the product formulations by wiping evenly on the headlight lens surface and letting it dry. The test results showed that both formulations successfully restored the hazy headlight lenses.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The invention claimed is:

1. A kit for a one-step headlight restoration comprising:
a wipe;
a formulation impregnated into said wipe, said formulation comprising: a polyurethane dispersion of aliphatic polycarbonate urethane dispersed in a carrier of at least one of alcohol or glycol, and water;
instructions for applying said formulation to a headlight surface that is hazed and was made of clear polycarbonate or poly(methyl methacrylate) (pMMA) using only said wipe impregnated with said formulation and letting the formulation dry to form a restorative film on the headlight surface and refinish the polycarbonate or pMMA to clear.

2. The kit of claim 1 further comprising at least additive of a biocide, an organic solvent, a defoamer, a wetting agent, or a light stabilizer.

3. The kit of claim 1 wherein said alcohol is present and is at least one of ethanol, n-propanol, or 2-propanol.

4. The kit of claim 1 wherein said glycol is present and is at least one of ethylene glycol, propylene glycol, dipropylene glycol n-propyl ether, propylene glycol methyl ether, propylene glycol n-propyl ether, dipropylene glycol n-butyl ether, tripropylene glycol n-butyl ether, propylene glycol phenyl ether, propylene glycol methyl ether acetate, dipropylene glycol methyl ether, oligomers thereof, or combinations thereof.

5. The kit of claim 1 wherein said formulation is impregnated into said wipe and further comprising an envelope containing said wipe.

6. A process of using the kit of claim 1 comprising:
opening an envelope containing said wipe;
contacting said wipe with the headlight surface to apply said formulation by wiping evenly on a headlight lens surface; and
allow sufficient time for said formulation to dry to form a restorative film.

7. The kit of claim 1 wherein said at least one of alcohol or glycol, and water are present in a weight ratio of said at least one of alcohol or glycol, to water of from 60:40 to 95:5.

8. The process of claim 6 further comprising reapplying said formulation after said restorative film is worn.

9. The process of claim 6 wherein said contacting is by rubbing said wipe on the headlight surface.

10. The process of claim 6 further comprising donning of gloves to limit user contact with said formulation.

11. The process of claim 6 further comprising donning glasses to limit user contact with said formulation.

12. The process of claim 6 further comprising donning of gloves to limit skin contact with said formulation.

* * * * *